SCREENING UNIT TESTS OF FUELS AT 3 PSIA

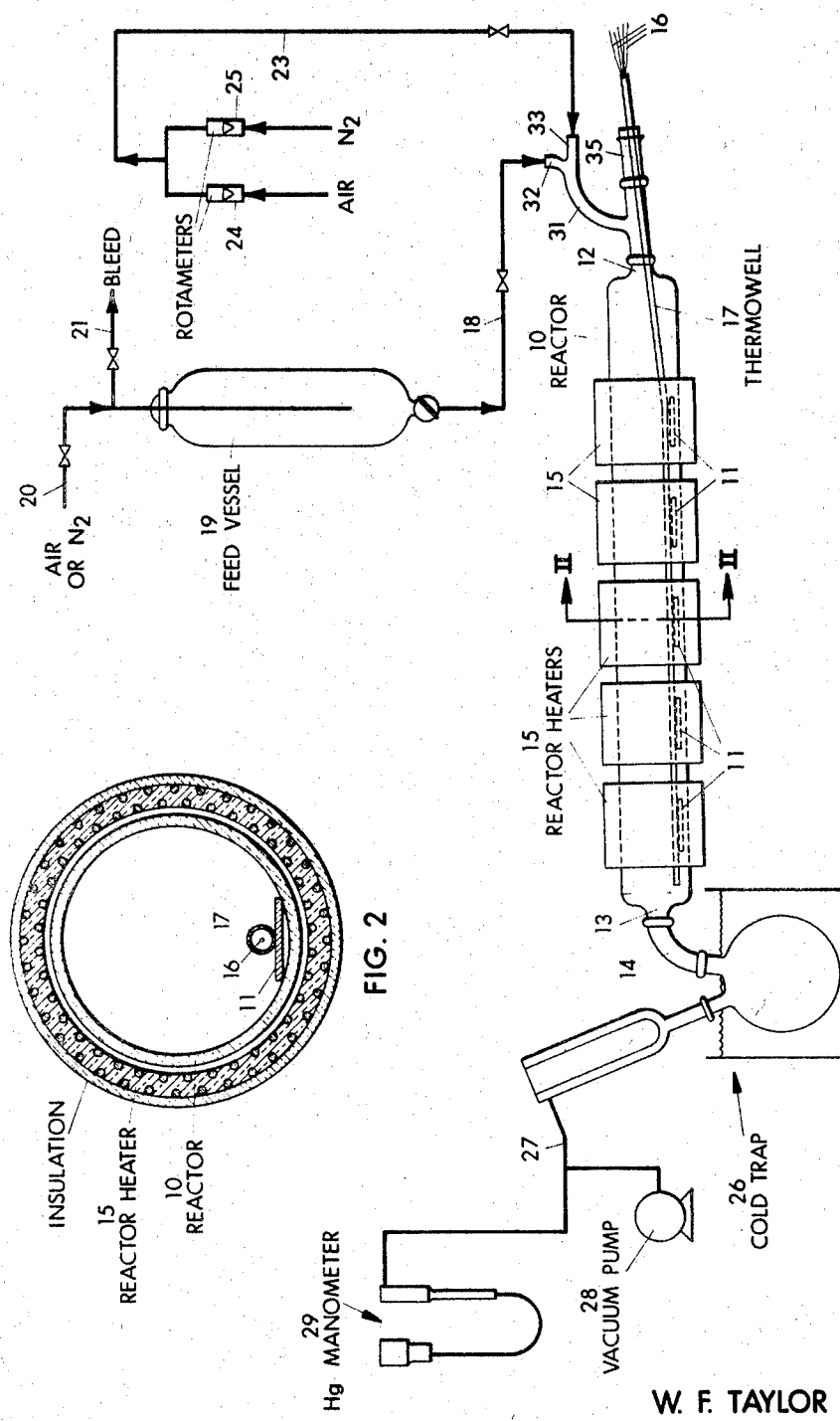

United States Patent Office 3,438,248
Patented Apr. 15, 1969

3,438,248
APPARATUS AND METHOD FOR TESTING
LIQUID HYDROCARBONS
William F. Taylor, Scotch Plains, and Thomas J. Wallace, Whippany, N.J., assignors to Esso Research and Engineering Company, a corporation of Delaware
Filed June 1, 1967, Ser. No. 642,812
Int. Cl. G01n 11/00
U.S. Cl. 73—61.2                7 Claims

ABSTRACT OF THE DISCLOSURE

The high temperature degradation of liquid jet fuels is measured by flowing a measured quantity of the fuel over a series of metal strips positioned at the bottom of an elongated enclosed inclined chamber. Heating elements provide a temperature gradient along the length of the chamber and temperature sensing elements measure the temperature of each metal strip. The gain in weight of the metal strips is measured to determine deposit forming tendencies of the fuel.

DESCRIPTION OF THE INVENTION

The present invention concerns an apparatus and a method for testing hydrocarbon jet fuels or similar liquid hydrocarbons for their deposit-forming tendencies at high temperatures such as those that are encountered under supersonic flight conditions of aircraft. One serious problem that is associated with the development of aircraft capable of flying at supersonic speeds is that high temperatures are developed on the metal surfaces of the aircraft at speeds of Mach 2.7 to 3 and higher. Such temperatures may reach 500° F. at Mach 3. As the flight continues and the wing tanks become empty or nearly empty, the remaining traces of fuel tend to undergo degradation and a film of degradation products forms on the inside of the tank. Usually, this film formation would present no serious problem if the film were to remain fixed. However, the film thickens with repeated deposition of degradation products and then tends to flake off, with resultant tendencies to clog fuel lines and the like. Since the degradation is an oxidation phenomenon, it could be prevented by maintaining at all times an inert or non-oxidizing atmosphere within the fuel tank as, for example, by carefully removing all dissolved oxygen from the fuel and by providing a blanket of nitrogen in the tank. However, there are many practical objections to using this procedure and it is more desirable to provide a jet fuel that is relatively free of deposit-forming tendencies. While a number of test devices and procedures have been developed for studying the deposit-forming tendencies of fuels, such as various coker tests, oxidation bomb tests and the like, by and large such tests have not provided results that could be correlated with the use fo the fuels in actual service. Thus, there has been needed a simple reproducible test to furnish a quantitative rating for jet fuels with respect to their deposit-forming tendencies.

In accordance with the present invention, an apparatus and a test method are provided which will quantitatively rate hydrocarbon jet fuels and other hydrocarbon fuels of a similar nature with regard to their tendency to form deposits under supersonic flight conditions. Briefly stated, the apparatus of this invention is specially designed to simulate the kinetic environment that is present in an "empty" wing tank in an aircraft when flying at supersonic speeds. The nature of the invention and the manner in which it is practiced will be better understood when reference is made to the accompanying drawings.

In the drawings:

FIGURE 1 is an exterior view of a test chamber in combination with a schematic diagram of associated apparatus for supplying measured quantities of fuel to the reaction chamber, for collecting degradation products that leave the chamber, and for regulating the temperature and pressure within the reaction chamber;

FIGURE 2 is a cross-section taken on line II—II of FIGURE 1; and

Figure 3:
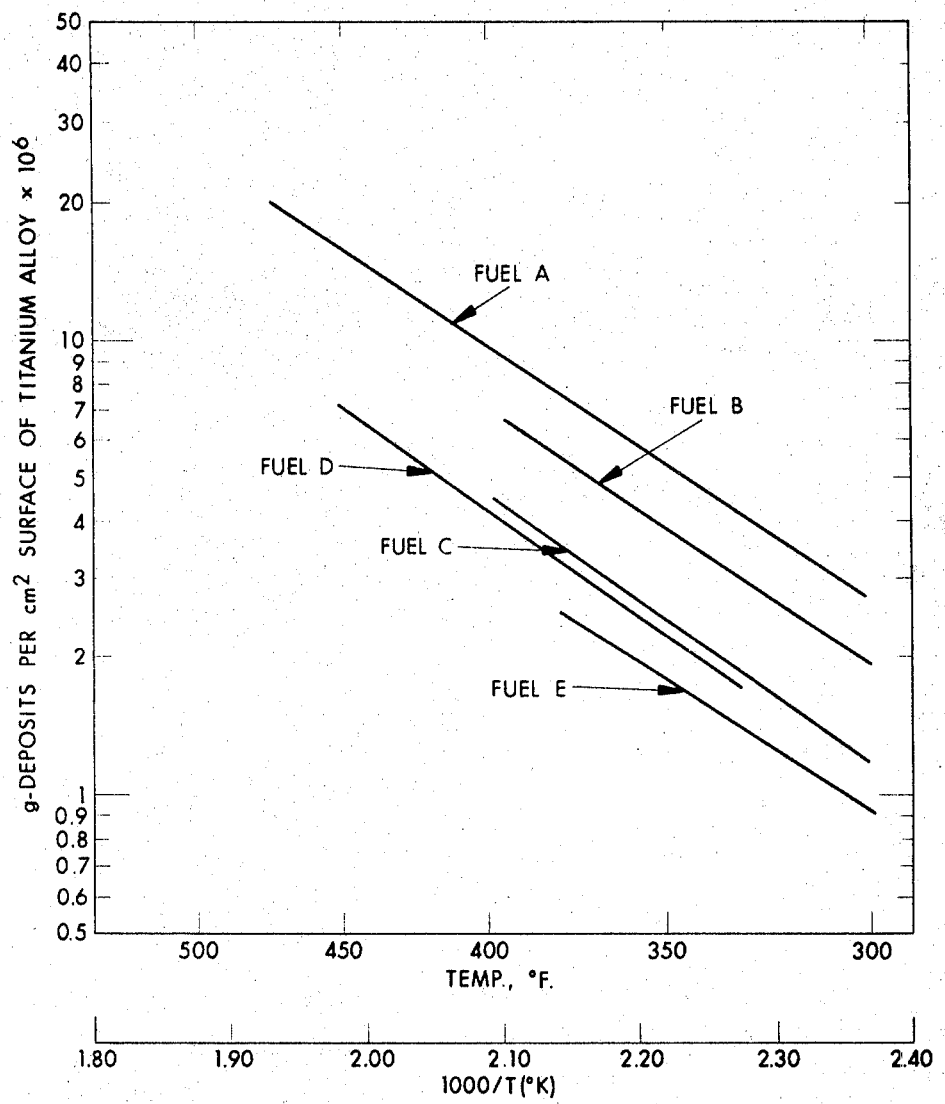
FIGURE 3 is a graph showing the relative deposit-forming tendencies of five fuels as determined by the method and apparatus of the invention.

Referring now to FIGURES 1 and 2 in detail, a generally tubular reactor 10 is provided which is disposed in a generally horizontal position, being slightly inclined so that liquid hydrocarbon that is introduced into the reactor will flow through the reactor by gravity. The reactor is constructed of material having little or no catalytic effect on the hydrocarbons. Generally glass is preferred. Distributed along the bottom of the reactor are a plurality of metallic strips 11. Typically, these strips will comprise titanium or an alloy of titanium with other metals, these being representative of the metals that are employed in the construction of fuel tanks for supersonic aircraft. The reactor is provided with an inlet 12 and an outlet 13 through which fuel or other hydrocarbon can flow along with air or nitrogen or other gas that is to be present in the reactor during the test. Surrounding the tubular reactor are a plurality of separate electric cylindrical heating units 15, each having an individual temperature control, e.g., a Gardsman temperature controller. These heaters are of standard design consisting of resistance wire wound on a ceramic core and covered with asbestos tape or the like. One of these heaters is arranged adjacent each of the metal strips. The temperature in the various zones defined by each of these heaters is determined by means of a plurality of thermocouples 16 inserted within a thermowell 17. The thermowell is likewise constructed of material that will have little or no catalytic effect on the fuel degradation, e.g., glass. By using a glass reactor and by separating the heaters a small distance apart is it possible to make visual inspection of the reactor sections during the test. During times when visual inspection is not necessary, excessive heat loss can be avoided by wrapping the reactor assembly with insulation.

The fuel to be tested is introduced into inlet 12 through valved supply line 18 from a fuel feed vessel 19. If the fuel is to be saturated with air prior to the test, air is introduced into vessel 19 through valved line 20 and removed through valved line 21.

Air or nitrogen or mixtures of the two in any desired proportion can be introduced into reactor 10 by means of valved line 23 and the rates of flow of these gases can be determined by means of rotameters 24 and 25.

To provide for the recovery and collection of products leaving the reaction zone, a cold trap 26 is positioned at the exit end of the reactor. The trap can be kept at a very low temperature, e.g., −78° C. Conventional cooling media, e.g., solid $CO_2$ or a mixture of solid $CO_2$ and trichloroethylene may be used. Also, there is provided a vacuum line 27 connected to a vacuum pump 28 so that the test unit can be operated under a controlled reduced pressure. The reduced pressure thereby obtained is measured by means of manometer 29. Generally a reduced pressure will be used in the test because an "empty" wing tank will usually operate at a low pressure below normal atmospheric during the majority of the time that it is exposed to high temperature conditions as, for example, when cruising at high altitudes such as 70,000 feet at Mach 2.7.

Reactor 10 can consist simply of an elongated glass tube provided with conventional ground glass male and female joints. A bent T-fitting 31 fits into the inlet end of the reactor and is provided with two nipples 32 and 33 to which the fuel feed line 18 and the gas feed line 23 can be attached. Thermowell 17 passes through the straight line portion of T-fitting 31 into the reactor and is attached to a plug member 35 which closes off the open end of fitting 31 when the thermowell is in place. By suitable shifting of fitting 31 and/or plug member 35 out of alignment with reactor tube 10, the thermowell, being sufficiently flexible, can be bent as shown, so that it lies essentially flat in close proximity to, or essentially touching the metal strips 11 so as to get an accurate reading of temperature adjacent each strip. The exit end of reactor 10 fits into exit tube 14, which in turn connects to cold trap 26.

Thus, ready access to the interior of reactor 10 is made possible by simply disconnecting the ground glass joints. The insertion of the metal strips 11 into the open end of the reactor is a fairly simple matter and they can be positioned along the reactor by means of a rod inserted into the end of the reactor.

In a typical embodiment, reactor 10 will be a glass tube of about 2 inches or so in diameter and the metal strips 11 will have dimensions of 1 centimeter by 10 centimeters and about 0.020 to 0.030 inch (i.e., about 0.05 to 0.08 cm.) thickness. They will be titanium strips or an alloy of titanium such as one made up of 90% titanium, 6% aluminum and 4% vanadium. The flow rate of fuel through the reactor will be typically from 100 to 300 cc. per hour, as, for example, about 125 cc. per hour, with a total reaction time of from 2 to 6 hours, e.g., 4 hours.

The angle at which the reactor is positioned relative to the horizontal will depend on the desired flow rate through the reactor. Typically that angle will be in the range of from about ¼ to 10° from the horizontal, e.g., 1°. Generally, the angle of pitch will be such as to make the contact time between the introduced liquid and the first metal strip in the series to be somewhere in the range of from about 5 to 60 seconds, or preferably about 10 to 20 seconds. Thus, for example, the reactor will be sloped so as to require 14 seconds for a given increment of liquid hydrocarbon to flow past the first strip. In most instances, the flow rate of hydrocarbon through the reactor is not critical in the test and will vary within wide limits, depending on the effects that are to be studied.

As the liquid fuel flows down the reactor, it progressively enters a hotter reaction zone where it is both partially vaporized and reacts with the oxygen that is present to form deposits. Thus, the time-temperature sequence that is encountered by the remaining liquid fuel in an "empty" tank during a typical supersonic transport flight is simulated along the length of the reactor tube. At the end of the test the strips are removed and weighed and the rate of deposit formation is measured by comparing the gains in weight for the various strips along the tube.

The following description illustrates the functioning of the apparatus and method of this invention. Metal strips 1 centimeter by 10 centimeters were cut from a sheet of titanium alloy 0.020 inch thick containing 90% titanium, 8% aluminum, 1% molybdenum, and 1% vanadium. The strips were washed with soap and water and dried before use, and were then weighed before being placed in the reactor. Five separate fuels were tested. Each fuel was presaturated with air prior to being admitted to the reactor. A temperature distribution in the range of from 300 to 500° F. from the inlet end to the outlet end of the reactor and a total pressure of 3 p.s.i.a. were employed. The flow rate of fuel was 125 cc. per hour, and air flow was controlled at 5 liters per minute. A total run time of 4 hours was used. At the end of each test the metal strips were removed and weighed in order to determine the effect of the temperature on deposit formation. An Arrhenius plot of the data obtained with the five fuels is shown in FIGURE 4. It will be noted that the five fuels differed in their basic reactivity toward deposit formation. Inspection data for these five fuels are given in the following Table I:

TABLE I.—PHYSICAL INSPECTIONS OF JET FUELS

| ASTM distillation, °F. | A | B | C | D | E |
|---|---|---|---|---|---|
| IBP | 334 | 368 | 330 | 336 | 403 |
| 5% | 348 | 372 | | 355 | 412 |
| 10% | 356 | 373 | 344 | 364 | 414 |
| 20% | 366 | 374 | 348 | 379 | 417 |
| 50% | 394 | 378 | 362 | 407 | 426 |
| 80% | 435 | 384 | | 442 | 440 |
| 95% | 466 | 393 | | 471 | 457 |
| Final | 484 | 409 | 456 | 481 | 463 |
| Wt. percent sulfur | 0.076 | 0.0008 | 0.0070 | 0.030. | <0.00002 |

The difference in basic reactivity toward deposit formation of the five fuels is also shown in the following Table II which gives the calculated rate of deposit formation at 350° F. for each fuel, as well as a figure for the relative activity for deposit formation:

TABLE II

| Fuel | Rate of deposit formation at 350° F., grams per cm.$^2$ surface per 4 hr. reaction time | Relative activity for deposit formation at 350° F. |
|---|---|---|
| A | 5.2×10$^{-6}$ | 2.88 |
| B | 3.7×10$^{-6}$ | 2.05 |
| C | 2.4×10$^{-6}$ | 1.33 |
| D | 2.1×10$^{-6}$ | 1.16 |
| E | 1.8×10$^{-6}$ | 1.00 |

Another useful piece of information which can be obtained by use of the apparatus and process of this invention is a "deposit formation cut-off temperature." An analysis of the results from each of the runs indicated that increasing quantities of deposits were formed as the temperature was increased, but at the highest temperature there was a decrease in the amount of deposits. This decrease, or leveling off effect in deposit formation rate appears to be a general phenomenon and it varies with the particular type of fuel being tested. This deposit formation cut-off temperature is considered to reflect the effect of changes in the liquid fuel as it passes through a series of rising temperature reaction zones at reduced pressure. These changes probably involve depletion of reactive species in the liquid fuel either as a result of chemical reactions or as a result of the physical process of vaporization. Approximate cut-off temperatures obtained with each of the five fuels mentioned are given in Table III:

TABLE III

| Fuel: | Screening unit deposit formation cut-off temperature at 3 p.s.i.a. °F. |
|---|---|
| A | 475 |
| B | 400 |
| C | 400 |
| D | 450 |
| E | 375 |

The usefulness of the test procedure and apparatus of the present invention is demonstrated by the fact that ratings obtained in the test are in general agreement with deposit formation tendencies of jet fuels in actual service. Thus, fuel A was found to be the least stable and fuel E the most stable fuel when these fuels were employed in actual service. Furthermore, the data obtained with the procedure and apparatus of this invention have been found to be highly reproducible.

There are at least three key principles which render the apparatus and method of this invention more advantageous than prior art methods and apparatus for evaluating fuels. These are:

(1) Use of light weight metal strips permits the quantization of deposits, a major weakness in all previous testers.

(2) Precise metal skin temperature control replaces the indirect temperature controls of previous tests; the rising temperature profile achieves the "breakpoint" concept in a single test instead of two or three.

(3) Once-through, gravity feed eliminates the problems arising from pumps and permits the simple control of dissolved oxygen in fuel, a critical variable in the amount and types of deposits observed.

Heretofore the industry has relied principally on the ASTM fuel coker test (D-1660) for ranking jet fuel. However, this test has been demonstrated to be poor in precision because of the visual rating technique that is used for measuring deposits, because of the inadequacy of temperature measurement and control and because of the tendency of the pump to shed wear debris when testing highly refined fuels. Furthermore, in order to determine the "break point" in fuel degradation, the fuel coker test requires repeating the test at different temperatures. In contrast, the present method and apparatus permit the determination of this break point in one test.

The present method and apparatus also provide an improvement over the fuel coker test in that they permit testing in a higher temperature range (400 to 600° F.) which the fuel coker test cannot provide without a major change in design, as, for example, utilizing a gas drive in place of a pump.

While this invention has been particularly devised for the testing of hydrocarbon jet fuels, it is evident that it is also applicable to the testing of other hydrocarbon liquids such as diesel fuels, heating oils, lubricating oils and the like, as well as non-hydrocarbon liquids such as various natural or synthetic esters.

What is claimed is:
1. A method for measuring the high temperature degradation of a liquid hydrocarbon which comprises the following steps:
 (a) Arranging a plurality of metal strips of known weight along an inclined path within an enclosed chamber;
 (b) Establishing a temperature gradient along said path, with the temperature increasing in the downward direction of said path;
 (c) Flowing a measured quantity of liquid hydrocarbon along said inclined path in contact with said metal strips;
 (d) Measuring the gain in weight of said metal strips.

2. Method as defined by claim 1 wherein said liquid hydrocarbon is pre-saturated with an oxygen-containing gas prior to its flow through said chamber.

3. Method as defined by claim 1 including the step of recovering liquid and vaporized hydrocarbons flowing from the exit of said chamber.

4. Method as defined by claim 1 wherein said reaction chamber is maintained at a pressure below atmospheric.

5. An apparatus for measuring high temperature degradation of liquid hydrocarbons which comprises in combination
 (a) an elongated enclosed chamber disposed in a slightly inclined position;
 (b) means for heating said chamber;
 (c) a plurality of removable metal strips disposed along the bottom of said chamber;
 (d) means for measuring the temperature within said chamber adjacent each of said metal strips; and
 (e) means for introducing a measured quantity of liquid hydrocarbon into the upper end of said chamber.

6. An apparatus as defined by claim 5 wherein said means for heating said chamber includes a plurality of individually controlled heating means disposed along the length of said chamber.

7. Apparatus as defined by claim 5 which includes means for reducing the pressure within said chamber below atmospheric pressure.

References Cited

UNITED STATES PATENTS

| | | | |
|---|---|---|---|
| 3,059,467 | 10/1962 | Meguerian et al. | 73—61.2 |
| 3,108,468 | 10/1963 | Mickel | 73—61.2 |
| 3,229,499 | 1/1966 | Shayeson et al. | 73—15 |

LOUIS R. PRINCE, *Primary Examiner.*

J. W. ROSKOS, *Assistant Examiner.*

U.S. Cl. X.R.

73—15